Patented Aug. 24, 1948

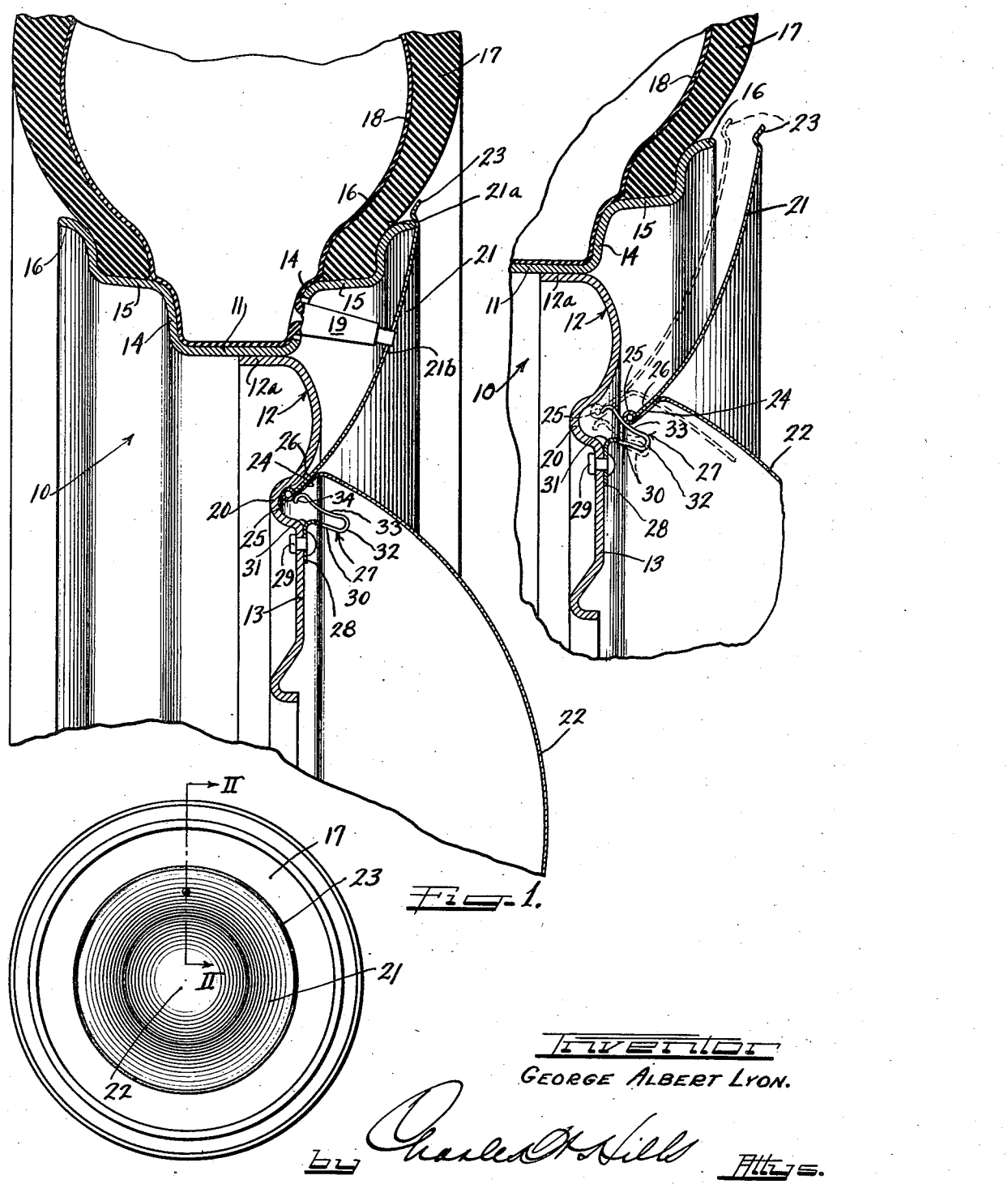

2,447,515

UNITED STATES PATENT OFFICE 2,447,515

WHEEL COVER

George Albert Lyon, Allenhurst, N. J.

Application November 1, 1943, Serial No. 508,470

5 Claims. (Cl. 301—37)

This invention is directed to an improved wheel structure and relates more particularly to an improved cover assembly therefor.

It is an important object of the invention to provide for a wheel structure improved retaining means for detachably maintaining the cover assembly thereon.

It is another object of the invention to provide for a wheel structure improved retaining means whereby an ornamental cover structure disposable over the outer side thereof may be attached thereto by the application of extremely light pressure to urge the cover axially inwardly with respect to the wheel and whereby, upon completion of the application of such axial pressure, the cover member is maintained tightly and securely on the wheel, necessitating a pry-off operation to remove the same therefrom.

It is a further object of the invention to provide an improved spring clip structure for detachably securing a cover member over the outer side of a wheel structure.

In accordance with the general features of the present invention there is provided herein a wheel structure having a central load bearing portion and a drop center type tire rim and a cover assembly including an outer annular part which preferably is provided with a cross-sectional expanse and curvature so as to extend from the edge portion of the tire rim radially inwardly beyond the junction of the rim with the central load bearing portion and so as to generally simulate the curvature of the side wall of a tire in the rim, thereby to give the appearance of being a part thereof and a continuation thereof, and to give the appearance of being the white side wall of a massive tire mounted on the rim, when colored white, there being provided circumferentially spaced retaining elements on the central load bearing portion for detachably securing the cover to the wheel by cooperation with the inner peripheral margin thereof, these retaining elements including spring clips having generally axially outwardly extending portions and generally axially inwardly, radially outwardly, obliquely disposed portions bent back upon said first portions, these portions of the spring clips being of such length as to enable the obliquely disposed portion, which is arranged to spring radially outwardly and abut the cover to hold the same against outward accidental movement, to flex radially inwardly with great ease so that the cover may be applied to the wheel by "finger tip" pressure and yet whereby the engagement attained will be secure.

It is still another object of the invention to provide, for a wheel structure, improved retaining means for maintaining a cover member over the outer side thereof in detachable relationship thereto, said retaining means comprising a generally axially outwardly extending resilient portion arranged to spring radially and a generally axially inwardly, radially outwardly, obliquely disposed terminal, resilient portion, springingly secured to the outer end of said first named portion whereby the attachment part of a cover may be pressed axially inwardly of the wheel structure and thereby cause flexure of the two above mentioned portions in a radially inward direction, whereby a dual resiliency is obtained, this dual resiliency enabling the both of said portions to spring radially inwardly to permit passage of the cover axially inwardly thereover, with a minimum of effort.

It is still another object of the invention to provide an improved wheel structure in which a portion thereof in the vicinity of cover retaining means is depressed axially inwardly to afford a recess into which the attachment part of the cover and the retaining means may extend, thus to permit disposition of the entire assembly axially inwardly of the wheel structure to a greater degree.

Other objects and advantages of the invention will become apparent from the following description and accompanying drawings in which:

Figure 1 is a side elevational view of a wheel structure embodying my invention;

Figure 2 is a fragmentary enlarged cross-sectional view taken on the line II—II of Figure 1; and Figure 3 is a fragmentary enlarged cross-sectional view similar to Figure 2, but showing the cover in a partially attached position.

As will be seen most clearly from Figures 1 and 2, the wheel structure with which the present invention may be associated includes a tire rim 10, having a base flange 11 to which may be secured, as by welding or riveting or the like, a peripheral, axially inwardly extending skirt 12a of a central load bearing portion or spider 12. The tire rim 10 is further provided with opposite side wall flanges 14, opposite intermediate flanges 15 and opposite edge portions 16 between which may be disposed a tire 17 having an inner tube 18 and a valve stem 19 which is aligned with, and arranged to extend through a suitable aperture in the respective side wall flange 14.

The central load bearing portion disclosed herein is further provided with a central bolt-on flange part 13 to which, as will be seen presently, suitable retaining means may be secured, the central load bearing portion 12 being further provided in the vicinity of this retaining means, with an axially inwardly formed annular part 20 which provides, on the outer side of the central load bearing portion 12, a depression into which an axially inner extremity of the attachment part of the cover, to be described presently, may be disposed.

In the construction shown herein, the cover includes an outer annular part 21 which, preferably is formed from thin sheet metal but, if desired, may be formed from any other suitable sheet material, and a central hub cap simulating, crowned portion 22. The cover member 21 preferably is provided with a cross sectional configuration of such shape and expanse that it extends from the edge portion 16 of the tire rim radially inwardly with a gradual curvature to a point on the wheel radially inwardly of the junction between the tire rim 10 and the central load bearing portion 12. Furthermore the cross-sectional curvature of this annular cover member 21 is preferably such as to generally simulate the contour of the side wall of the tire 17, thereby to give the appearance of being a continuation thereof and a part thereof, and particularly to appear as a white side wall of a massive tire, when colored white.

If desired, the outer margin of the cover member 21 may be so formed as to provide an overlapping part 21a which, to a degree, envelops the edge of the edge portion 16 and terminates in a flange 23 which extends radially outwardly to conceal the junction between the tire and the edge portion 16 of the tire rim. Furthermore, the cover member 21 may be provided with an aperture 21b through which the outer end of the valve stem 19 may be accessible or, if desired, this aperture may be dispensed with, in which event, the valve would be slightly shorter than that shown, and access to the valve would be accomplished by removal of the cover from the wheel in a manner to be explained presently.

The central hub cap simulating cover 22, as explained previously, is provided with a central crowned portion and is further provided at the radially outer margin thereof with a generally axially inwardly, radially inwardly, obliquely disposed flange 24 terminating in a bead 25.

As shown in the drawings the radially inner margin 26 of the cover member 21 is disposed in surface engagement with the outer surface of the flange 24 and the radially inner peripheral edge of the cover member 21 is disposed in abutting engagement with the adjacent side of the bead 25 of the cover member 22. In the event that the cover member 21 is constructed from non-resilient metal, the flange 24 is formed upon the cover member 22, whereupon the cover member 21 is disposed in the position shown, and the bead 25 is then formed on the edge of the flange 24 which protrudes beyond the inner peripheral margin 26 of the cover member 21. With such a construction it will be seen that there is formed a unitary, multi-part cover assembly in which the parts are securely maintained together, the junction of the parts forming a generally axially inwardly extending, radially inwardly extending, generally obliquely disposed, multi-thickness attachment flange which is further reinforced by the bead 25.

To the end that the cover assembly above described may be securely maintained over the wheel structure and may be secured thereto by the application of mere light, fingertip pressure against the outside of the cover, there is provided herein a novel retaining assembly which includes preferably a plurality of circumferentially spaced, circularly disposed attachment members 27. Each of these attachment members or spring clips is provided with a radially inwardly extending portion 28 which may be an individual member in the case of each or may be in the form of an annulus as shown, with the individual clips or retaining members extending outwardly therefrom in integral relationship thereto. As shown in the drawings, the annulus 28 is secured to the bolt-on flange 13 of the central load bearing portion 12 by means of suitable rivets 29 or the like. As shown in the drawings, each of the spring clip members 27 includes a generally axially outwardly extending portion 30 which is resiliently associated with the attachment portion 28 by flexure at the curved junction 31 between these portions. Each of the portions 30 in turn terminate through a curvate, resilient junction 32 in a generally axially inwardly, radially outwardly extending resilient portion 33 terminating preferably in a rounded end 34 which, as will be seen presently, is arranged to abut the adjacent portion of the inner surface of the flange 24 and the central cover member 22.

With the foregoing construction it has been found that the action of the spring clips during the attachment of the cover thereover is quite different from those heretofore utilized. As best shown in Figure 3, axial inward movement of the bead 25 causes a dual resilient action to take place in each of the spring clips. First, the portion 33 of each of the clips is sprung radially inwardly due to cam action while, secondly, the mounting therefor, that is the portion 30, also springs radially inwardly about the resilient junction 31. This dual resiliency provides radial inward springing of the entire clip assembly due to the cam action of the bead 25 against the portion 33, this inward movement being accomplished, because of the multiple flexure of the clip, with a minimum of necessary reaction or pressure on the part of the operator in urging the cover axially inwardly. On the other hand, in spite of the minimum pressure involved in applying the cover to the spring clips, it will be seen that once the bead 25 has passed axially inwardly beyond the hump formed at the terminal end of the spring portion 33, the latter will snap outwardly into abutting engagement at the axially outer side of the flange 24 as shown in Figure 2. Under these circumstances, it will be seen that when in the position shown in Figure 2, the cover will be securely and rigidly maintained upon the wheel structure and may be removed therefrom only by the application of considerably axial outward pressure applied to the radially outer portion of the cover member 21 in the vicinity of the flange 23.

While the operator may utilize a pry-off tool to urge the radially inner portion of the cover member 21 outwardly over the spring clips to remove the cover therefrom, it has been found that generally it is sufficient for the operator to firmly grasp the flange 23 and pull the same outwardly whereupon the cover snaps away from the clips 27.

From the foregoing it will be seen that with the structure disclosed in the drawings and described above, the operator may apply the cover to the wheel structure by the utilization of mere finger-tip pressure and thus the necessity of pounding the cover home over the spring clips is obviated. This is of great advantage since under certain conditions it is found that with constructions in which the cover must be pounded home, very often the finish on the outer side of the cover is marred or the cover itself is indented slightly.

Another important aspect of the invention is the wheel structure and its cooperation with the aforementioned attachment flange of the cover assembly and spring clips 27 for maintaining the same on the wheel.

As shown in the drawings and as explained previously, the central load bearing portion 12 of the wheel structure is preferably provided with an axially inwardly, circular indentation 20 which is preferably disposed radially outwardly of the spring clip retaining annulus 28 so that the terminal end of the spring clip portion 33 is in alignment with the axially outwardly opening groove formed by the indentation 20. Thus, as will be seen, when the cover is applied to the wheel structure, the bead 25 extends into the axially opening groove whereby the entire cover is permitted to assume a position axially inwardly to a greater degree than would be the case if the groove were not present. Furthermore, the presence of the groove provides a seat for the bead 25 against which the bead may be pressed by the spring clips so that proper alignment and secure attachment of the cover member on the wheel structure will be assured.

What I claim is:

1. In a wheel structure including a tire rim and a body part having an axially outwardly opening annular groove, a wheel cover adapted to be mounted in covering relation to the outer side of the wheel structure, separately formed inner and outer circular cover portions, said inner portion having its radially outer margin formed to provide a generally axially inwardly and radially inwardly extending flange, the inner margin of said outer cover portion being disposed in snug face to face relation with the outer face of said flange, an outturned retaining and reinforcing bead on said flange protruding beyond said margin and effectual to lock said cover portions against separation, the united flange and margin cooperating to provide a multi-thickness attachment flange for the cover substantially reinforced by said bead, said bead being received in said groove, and retaining means on said body part holding said bead against the radially outer side of said groove.

2. In a wheel structure including a tire rim and a central load bearing portion having an annular axially outwardly opening groove therein spaced radially inwardly from said tire rim, a circular cover for disposition over the outer side of the wheel and including an outer annulus and an inner circular hub cap member, said hub cap member having the margin thereof formed as a generally axially inwardly and radially inwardly extending, generally obliquely disposed flange, the inner margin of said annulus being in facewise engagement with the outer face of said flange, an outturned reinforcing bead along the edge of said flange and protruding axially and radially beyond the inner peripheral edge of said annulus to lock the annulus and hub cap member against separation, said bead being of a diameter to fit in said groove, and means on said body portion constructed and arranged with respect to the multi-thickness flange structure formed by said beaded flange and the engaged annulus margin to engage said multi-thickness flange in snap-on fashion responsive to relatively light fingertip axially inward pressure applied to the cover assembly for urging said bead into said groove.

3. In a wheel structure having a tire rim and a central load bearing portion, a circular cover for disposition over the outer side of a wheel and including an outer annulus and an inner circular hub cap member, said hub cap member having the margin thereof formed as a generally axially inwardly and radially inwardly extending, generally obliquely disposed flange, the inner margin of said annulus being in facewise engagement with the outer face of said flange, an outturned reinforcing bead along the edge of said flange and protruding axially and radially beyond the inner peripheral edge of said annulus to lock the annulus and hub cap member against separation, and means on said body portion constructed and arranged with respect to the multi-thickness flange structure formed by said beaded flange and the engaged annulus margin to engage said multi-thickness flange in snap-on fashion responsive to relatively light fingertip axially inward pressure applied to the cover assembly for mounting the same upon the wheel, said body portion having an annular groove therein receptive of said beaded multi-thickness cover flange and said attaching means being so related to said groove that in the cover retaining relationship said bead is held firmly seated within said groove.

4. In a wheel structure including a tire rim and a load sustaining body portion offset substantially axially inwardly relative to the outer edge of the tire rim, said body portion having an axially outwardly opening annular groove therein, a cover member for disposition over the outer side of the wheel structure including a radially outer annular cover member and a central circular hub cap member disposed concentrically relative to one another, said hub cap member having a generally axially and radially inwardly obliquely disposed marginal flange, said outer annular cover member being of a uniformly convex cross-sectional configuration generally simulative of a tire side wall curvature and extending from the outer edge of the tire rim curvingly inwardly in general simulation of a radially inward extension of the tire side wall to give the appearance of a massive tire on the wheel and entirely covering the tire rim and a part of said body portion, the inner margin of said outer annular cover member being in snug facewise engagement with the outer face of said hub cap member flange, a bead on said flange retainingly related to the inner edge of said outer annular cover member to lock the cover members against separation and reinforcing the multi-thickness flange structure formed by the combined flange and contiguous margin, and means on said body portion engageable with the inner side of the reinforced multi-thickness flange structure for holding the composite cover in snap-on pry-off assembled relation within said groove in the body portion.

5. In a wheel structure including a tire rim and a load sustaining body portion offset substantially axially inwardly relative to the outer edge of the tire rim and having an annular axially outwardly opening groove therein, a cover member for disposition over the outer side of the wheel structure including a radially outer annular cover member and a central circular hub cap member disposed concentrically relative to one another, said hub cap member having a generally axially and radially inwardly obliquely disposed marginal flange, said outer annular cover member being of a uniformly convex cross-sectional configuration generally simulative of a tire side wall curvature and extending from the outer edge of the tire rim curvingly inwardly in general simulation of a radially inward extension of the tire side wall to give the appearance of a massive tire on the wheel and entirely covering the tire rim and a part of said body portion, the inner margin of said outer annular cover member being in snug facewise engagement with the outer face of said hub cap member flange, a bead on said flange retainingly related to the inner edge of said outer annular cover member to lock the cover members against separation and reinforcing the multi-thickness flange structure formed by the combined flange and contiguous margin, said bead being adapted to engage within said groove in the body portion, and means on said body portion engageable with the reinforced multi-thickness flange structure for holding the composite cover in snap-on pry-off assembled relation on the wheel structure with said bead in said groove, the radially outer margin of said annular outer cover member projecting beyond the outer edge of the tire rim and adapted to be engaged manually for prying the composite cover off of the wheel structure.

GEORGE ALBERT LYON.

REFERENCES CITED

The following references are of record in the file of this patent:

UNITED STATES PATENTS

| Number | Name | Date |
| --- | --- | --- |
| Re. 22,119 | Lyon | June 16, 1942 |
| 2,051,501 | Sorensen et al. | Aug. 18, 1936 |
| 2,190,669 | Lyon | Feb. 20, 1940 |
| 2,213,861 | Horn | Sept. 3, 1940 |
| 2,239,367 | Lyon | Apr. 22, 1941 |
| 2,265,241 | Lyon | Dec. 9, 1941 |
| 2,281,153 | Horn | Apr. 28, 1942 |
| 2,386,241 | Lyon | Oct. 9, 1945 |